US006170254B1

(12) United States Patent
Cariola (10) Patent No.: US 6,170,254 B1
(45) Date of Patent: Jan. 9, 2001

(54) TRANSLATING SLEEVE FOR CASCADE TYPE THRUST REVERSING SYSTEM FOR FAN GAS TURBINE ENGINE FOR AN AIRCRAFT

(75) Inventor: Roy E. Cariola, San Diego, CA (US)

(73) Assignee: Rohr, Inc., Chula Vista, CA (US)

( * ) Notice: Under 35 U.S.C. 154(b), the term of this patent shall be extended for 0 days.

(21) Appl. No.: 09/260,462

(22) Filed: Mar. 2, 1999

Related U.S. Application Data (60) Provisional application No. 60/112,886, filed on Dec. 18, 1998.

(51) Int. Cl.[7] .............................. F02K 3/02; F02K 1/00; B64C 25/68
(52) U.S. Cl. ........................ 60/226.2; 60/230; 244/110 B
(58) Field of Search .................................. 60/226.2, 230, 60/232, 266; 244/110 B; 239/265.27

(56) References Cited

U.S. PATENT DOCUMENTS

| | | | | |
|---|---|---|---|---|
| 4,545,199 | * | 10/1985 | Sankey et al. ..................... | 60/226.2 |
| 5,575,147 | * | 11/1996 | Nikkanen ........................... | 60/226.2 |
| 5,806,302 | * | 9/1998 | Cariola et al. ..................... | 60/226.2 |
| 5,863,014 | * | 1/1999 | Standish ........................... | 244/110 B |

\* cited by examiner

Primary Examiner—Timothy S. Thorpe
Assistant Examiner—Michael K. Gray
(74) Attorney, Agent, or Firm—Patrick J. Schlesinger; James M. Rashid (57) ABSTRACT

A translating sleeve structure for a cascade type thrust reverser system for controlling fan air for a turbofan aircraft gas turbine jet engine, such translating sleeve having a plurality of circumferentially arranged spaced blocker doors, each of which is hingedly connected to a door receptacle bonded into a single layer honeycomb panel inner wall of the sleeve at a longitudinal position which is aft of bleed ports positioned in the core cowl of the engine for periodically expelling gases from the engine at elevated temperatures and pressures. Positioning such blocker doors aft of the bleed ports precludes injury to the blocker doors or to their hinged connections to the core cowl and permits smaller uniformly sized doors to be used. A fan air flow deflector positioned at the leading inner portion of the inner wall of the translating sleeve assists in turning the flow of the reversed fan air through a cascade structure and access doors provided in the sleeve are vented to permit any fan air that may enter the interior of the sleeve when it is deployed to vent to the exterior without any air pressure buildup within such sleeve.

21 Claims, 7 Drawing Sheets

TRANSLATING SLEEVE FOR CASCADE TYPE THRUST REVERSING SYSTEM FOR FAN GAS TURBINE ENGINE FOR AN AIRCRAFT

CROSS RELATED APPLICATION

This application claims the benefit of U.S. Provisional Application No. 06/112,886 filed Dec. 18, 1998 under 35 U.S.C. 119 (e).

FIELD OF THE INVENTION

The present invention relates generally to an improvement in the field of thrust reversing systems for fan gas turbine engines for aircraft and more particularly, but not by way of limitation, to an improved cascade type thrust reverser system for controlling fan air from a fan gas turbine jet engine for an aircraft, said engine having a core cowl that is provided with bleed ports positioned aft of a fixed fan cowl structure.

BACKGROUND OF THE INVENTION

It is well known in the field of aircraft gas turbine engine propulsion systems to provide a thrust reversing system to slow the aircraft down when it has contacted the landing field and the brakes have been applied to the wheels of the aircraft. These thrust reversing systems are deployable to reverse the fan air of a by-pass fan type aircraft gas turbine jet engine and in some instances to reverse the combined flow of the fan air and main thrust gases issuing from the nozzle of the core engine. Generally speaking, a target type thrust reverser system is used for smaller aircraft gas turbine jet engines, a pivoting door thrust reverser system is used for larger aircraft gas turbine jet engines and a cascade type thrust reverser system is used for the largest high by-pass fan aircraft gas turbine jet engines. Each thrust reversing system has its advantages and limitations for the particular size of aircraft gas turbine engine with which it is used.

An early example of a translating sleeve thrust reverser system, which was the forerunner of the cascade type thrust reverser system, is seen in U.S. Pat. No. 3,036,431 which shows a translating sleeve which forms the fan duct being translated aft by translating actuator means. As the translating sleeve is translated aft a plurality of blocker doors positioned forwardly of the translating sleeve in a fixed cowl structure are rotated inwardly into abutting contact with the core cowl of the aircraft gas turbine engine in order to block the fan air and reverse its flow forwardly through the opening created by the translated sleeve structure and the fixed cowl structure.

U.S. Pat. No. 3,262,270 illustrates a later translating sleeve thrust reverser system in which a lower translating sleeve carries a plurality of circumferentially arranged blocker doors on its inner forward edge, the blocker doors being hingedly connected to the core cowl so that translation of the lower translating sleeve causes the blocker doors being drawn inwardly by such hinged connections into abutting contact with the core cowl and to reverse the fan air through the ii- opening created by an upper translating sleeve portion and a fixed cowl structure. The sleeve structure of this thrust reverser system actually comprises two sleeve portions, one being translatable and another being fixed which carries a fixed cascade structure through which the reversed fan air flow flows.

The most common type of cascade type thrust reverser system in use today for an aircraft fan gas turbine jet engine employs a forward fixed cowl portion and a translating sleeve which carries a plurality of circumferentially arranged blocker doors on its inner skin surface. The blocker doors are hingedly connected to the translating sleeve and are also hingedly connected to the core cowl of the jet engine so that aft translation of the translating sleeve causes the blocker doors to be drawn inwardly into fan air blocking abutment with the core cowl and cause the reversed fan air to flow through the opening provided by the translated sleeve and the fixed cowl portion A plurality of cascades are either fixedly positioned in the exposed opening or are translated into such opening by the translation of the sleeve structure. While such a thrust reversing system is in common use in the art, it is still possible to improve upon such an arrangement.

Characteristically, such an arrangement provided for the inner sleeve to be constructed by adhesively bonding a number of detail parts together to provide for openings for such blocker doors and the requisite hinged connections. Also, to preclude any tendency for air to leak through the multiplicity of bonded parts a backing layer in the form of a honeycomb core panel termed a "pressure shelf" was bonded to the inner side of the inner skin of the translating sleeve structure. Such a arrangement was expensive to manufacture. Also, this arrangement provided for the blocker doors to be provided at the leading edge of the translating sleeve structure and did not take into account the deleterious effect of fluid being expelled, from time to time, at an elevated pressure and temperature though bleed ports provided in the core cowl to alleviate undesired buildup of pressures associated with the core engine. Such expulsions when they occur could be very injurious to the blocker doors and their hinged link connections.

Also, since the blocker doors were positioned at the leading edge of the inner skin of the translating sleeve the sizing of such blocker doors to accommodate the fan air duct was limited in that only a certain level of efficiency of limitation of blow-by of fan gases past the closed blocker doors could be achieved. A mid frame stiffening structure was also characteristically interposed between the inner and outer skins of the translating sleeve and added to the weight and manufacturing complexity of such a sleeve.

U.S. Pat. No. 4,545,199 is directed to a fan cascade thrust reverser particularly adapted for a military aircraft where it was desirable to substantial eliminate the problems of engine ingestion of reversed gases and of the dust and blowing about of foreign objects when landing, taking off or ground maneuvering. This thrust reverser provides a lower non-translating sleeve section and an upper translatable sleeve section that could be translated to expose an opening between such translating sleeve section and a fixed cowl structure. The blocker doors include a first set that rotatably attached to the upper translating sleeve section and a second set of blocker doors that are circumferentially arranged around the core cowl and are connected to the fixed lower sleeve portion and to the upper sleeve portion Both sets of blocker doors were suitably rotated inwardly to block the fan air and direct it upwardly and outwardly from the thrust reverser. No thought was given to the location of the bleed port means in the core cowl in this arrangement.

U.S. Pat. No. 4,858,430 is directed to a pivoting door arrangement in which a plurality of large pivoting blocker doors have their inner and outer skins forming part of the inner and outer flow surfaces of a fixed cowl portion. Such pivoting doors are pivoted outwardly to cause their inner trailing surfaces to contact the core cowl of an aircraft engine and reverse the fan air flow. This patent shows that the each pivoting door may be provided at its leading edge with an opening to assist the reversed fan air in flowing forwardly by increasing the space available for such fan air flow.

U.S. Pat. No. 4,914,905 is a variation of the pivoting door thrust reverser arrangement described above and also teaches the provision of an air deflector positioned at the trailing edge of the fixed cowl portion of the thrust reverser. Characteristically, such a pivoting door arrangement is provided with a "pit" formed by the leading edge of each blocker door and the trailing edge of such door to enhance the thrust reversing capability of the pivoting door when opened. This patent also teaches that the air deflector could also be attached to an actuator for each door in the immediate vicinity of the fixed cowl structure.

While the aforesaid and other thrust reverser arrangements have been generally satisfactory for thrust reversing purposes a general need continues to exist for improvements in thrust reversing arrangements to decrease their cost, increase their reliability and performance, to reduce their weight, and to increase the ease of manufacture.

Accordingly, it is a general object of this invention to provide a cascade type thrust reversing arrangement which decreases the cost of manufacture of the translating sleeve structure and which provides for the positioning of the blocker doors in a position which precludes damage to such doors from fluid emanating from bleed ports in the core cowl.

It is another object of the invention to provide an improved translating sleeve structure which accommodates blocker doors all having the same size and being positioned to increase the efficiency of the thrust reverser to an optimum blow-by fan air percentage.

It is still another object of the invention to provide an improved translating sleeve structure which eliminates a mid fame structure therein and that precludes a build up of pressure of the reversed fan air in the interior of the translating sleeve structure.

It is yet another object of the invention to provide an improved translating sleeve structure that provides improved fan air flow through the opening provided the deployment of such sleeve structure.

It is a further general object of this invention to provide pressure seal means that cooperates with the translating sleeve structure in its stowed position to preclude outward leakage of the fain air during thrust and which is optimally positioned to preclude interference with the reversed fan air and to enhance the service life of such seal means The foregoing has outlined some of the more pertinent objects of the invention. These objects should be construed to be merely illustrative of some of the more prominent features and application of the intended invention Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

Briefly stated, the present invention contemplates an improved cascade type thrust reversing system for controlling fan air from a fan gas turbine jet engine for an aircraft, the engine having a core cowl which is provided with circumferentially arranged bleed port means of the engine that are positioned aft of a fixed fan cowl structure. The invention includes a forward fixed structure having inner and outer walls positioned immediately aft of such fixed fan cowl structure and a translatable sleeve structure that is positioned in an abutting position, in a stowed position, to said forward fixed structure and having inner and outer walls, the inner wall of said sleeve structure being provided with a plurality of circumferentially arranged deployable blocker doors that are horizontally positioned in said inner wall aft of the bleed port means. The translatable sleeve structure preferably is provided with a inner wall comprising a single layer honeycomb core panel structure having circumferentially arranged receptacles for receiving the blocker doors. Each receptacle comprises a single unitary metal receptacle having hinge means for hingedly receiving each blocker door and hinge connections are provided to hingedly connect each blocker door to the core cowl.

A translating means is actuable to translate the translating sleeve structure rearwardly to deploy the blocker doors by causing them to rotate inwardly into abutting contact with the core cowl and thereby block the fan air and redirect it outwardly through an annular spaced provided between said forward fixed structure and the translatable sleeve structure. When the translatable sleeve structure is stowed a suitable fixed cascade arrangement is positioned within the translating sleeve structure for directing the reversed fan air flow in desired directions when the sleeve structure is translated.

Each blocker door is hingedly connected to the core cowl a sufficient distance aft of the bleed ports to preclude damage to the blocker doors and to the blocker doors' hinged connections in the event a gas turbine jet engine positioned within said core cowl should expel gas from the core engine through said bleed ports at an elevated temperature and pressure. Since the blocker doors are positioned aft of the leading edge of the translating sleeve structure they may be made smaller and all have the same size since they will be brought into abutting contact with an enlarged portion of the core cowl and will accordingly, need be of a smaller size to provide a desired exit area. Since the blocker doors are smaller they will permit a closer fit to one another and thereby permit the amount of blow-by fin air that flows around such deployed blocker doors to be determined to be an optimum amount for a particular engine application. The inner wall of the translating sleeve is preferably acoustically treated as are the blocker doors. However, since the blocker doors are smaller than conventional blocker doors if a determination is made not to acoustically treat such blocker doors, to the loss of acoustic treatment in that instance will not be so great due to such reduced size.

The access doors that permit access to the end of the translating means secured to the translatable sleeve structure are vented to permit any reversed fan air that may flow into the interior of the translating sleeve structure to be vented to the outer skin of such sleeve structure to preclude an undesired pressure build up within such sleeve structure.

The direction of the reversed fan air flow is enhanced by the provision of an annular arcuate flow deflector structure that is positioned on the leading inner portion of the inner skin of the sleeve structure. A first continuous annular pressure seal is located on the inner portion of the forward fixed structure and cooperates with the annular flow deflector structure to preclude fan air, during thrust, from tending to leak between the forward fixed structure and the translatable sleeve structure. A second continuous annular seal is located on the upper portion of the forward sleeve structure and cooperates, when the translating sleeve is deployed, with the aft cascade ring to enhance the sealing off the rearward inner portion of the translating sleeve and to damp any vibrations of the cascade ring caused by the reversed flow of fan air through the cascades when the thrust reverser is deployed.

The foregoing has outlined rather broadly the more pertinent and important features of the present invention in order that the detailed description of the invention that follows may be better understood so that the present contributions to the art may be more fully appreciated. Additional features of the invention will be described hereinafter which form the subject of the clams of the invention. It should be appreciated by those skilled in the art that the conception and the disclosed specific embodiment may be readily utilized as a basis for modifying or designing other structure and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

Similar numerals refer to similar parts in all FIGURES.

DETAILED DESCRIPTION OF THE DRAWINGS

Figure 1:
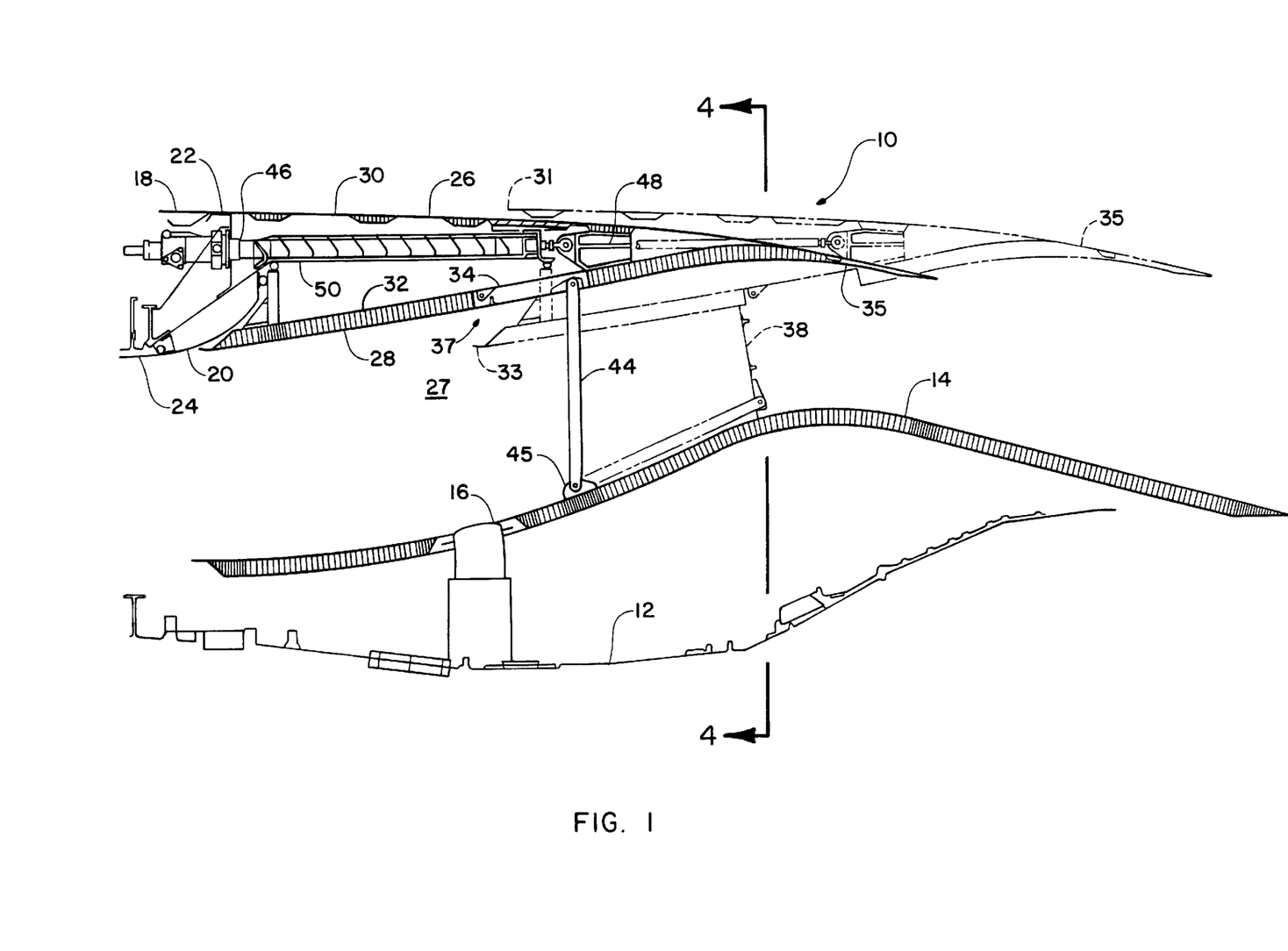
FIG. 1 is a simplified cross section of the improved cascade type thrust reverser system for a fan gas turbine engine for an aircraft shown in its stowed and deployed positions and constructed in accordance with a preferred embodiment of the present invention.

Referring now to the drawings in general and to FIG. 1 in particular, reference character 10 generally designates an improved cascade type thrust reversing system, for controlling fan air from a fan gas turbine jet engine for an aircraft, that is constructed in accordance with a preferred embodiment of the present invention. A fan gas turbine engine 12 for an aircraft is provided with a suitable core cowl 14 constructed in accordance with the teachings of the art. Characteristically, the core cowl 14 generally conforms to the configuration of the core engine 12 with allowances being made as needed to accommodate the usual auxiliary equipment of the engine 12. As generally seen in FIG. 1, the core cowl 14 as it passes the compressor section of engine 12 begins to increase in diameter to accommodate the combustor and turbine sections of the engine 12. Thereafter, as the core thrust gases of the engine 12 exit the nozzle (not shown) of the engine the diameter of the core cowl 14 decreases. The core cowl 14 is also provided with a plurality of circumference arranged spaced bleed port ducts 16 that communicate with the high pressure portion of the compressor section of the engine. Periodically, a need will arise for the high pressure section of the engine 12 to relieve an undesirable extraordinary high pressure condition by venting the highly compressed air to the exterior of the engine. The temperature and pressure of such vented compressed air are elevated with the temperature of the air, for example, ranging from 600° to 1000° F.

The problem presented to a cascade type thrust reversing system by such bleed ports is that they are generally arranged in the vicinity of the leading portion of the translating sleeve structure of such a cascade type thrust reverser and the plurality of circumferentially arranged spaced hinged blocker doors carried by a translating sleeve structure are usually hinged to the core cowl by suitable link connections. Thus, as the translating sleeve is deployed aft the hinged blocker doors are drawn into a fan air blocking position. Unfortunately, there is no way of determining when conditions may arise that dictate the core engine 12 to need to expel high temperature and high pressure gases from the compressor section of the engine. These high pressure and temperatures of the gas issuing from a bleed port would then tend to impinge upon the hinged connections of the blocker doors or upon the blocker doors themselves and cause distortion and injury to such parts. The present invention is intended to alleviate this problem.

The improved cascade type thrust reverser 10 of the present invention includes a forward fixed structure 18 having an inner wall 20 and an outer wall 22 that is positioned immediately aft of a fixed fan cowl structure 24. A novel translatable sleeve structure 26 is positioned in a stowed position that abuts to said forward fixed structure 18. The translatable sleeve structure 26 has a smooth inner wall 28 and a smooth outer wall 30. The smooth inner wall 28 cooperates with the core cowl 14 to define a bypass fan air duct 27. As seen in FIG. 1, the inner and outer walls 28 and 30 having leading edges 29 and 31 respectively, are spaced apart at the leading edge 33 of the translating sleeve structure 26 and are fastened together in any suitable manner at the trailing edge 35 of such translating sleeve structure 26. It should also be noted for a purpose that will be hereinafter be made more clear that the aforesaid arrangement of the translating sleeve structure 26 is not provided with the customary mid-frame reinforcing structure.

The inner wall 28 of the translating sleeve structure 26 is preferably constructed in accordance with the teachings of co-pending patent application entitled "Blocker Door Frame Pressure Structure for Translating Cowl of Cascade Thrust Reverser for Aircraft Jet Engines" by Abbot Masters et al and assigned to the assignee of the present application. Such application was filed on Sep. 24, 1997 under Ser. No. 08/936,711 and is incorporated by reference. In accordance with such teachings, the inner wall 28 of the translating sleeve structure 26 comprises a single layer honeycomb core panel 32 that is provided with a plurality of spaced circumferentially arranged blocker door receptacles 34, as seen most clearly in FIG. 2. Preferably, the inner wall 28 is acoustically treated by providing a single degree of freedom (SDOF) acoustic panel comprising a perforated outer sheet, a honeycomb core and a solid backing skin. Each of such blocker door receptacles 34 is preferably metallic and may be either machined or precision forged. Each blocker door receptacle 34 is provided with a flange portion 36 that is suitably bonded to the inner side of the honeycomb core panel 32 to fit precisely within an aperture provided within such panel 32 thereby eliminating the pressure shelf and numerous bond details of the previous constructions.

Figure 4:
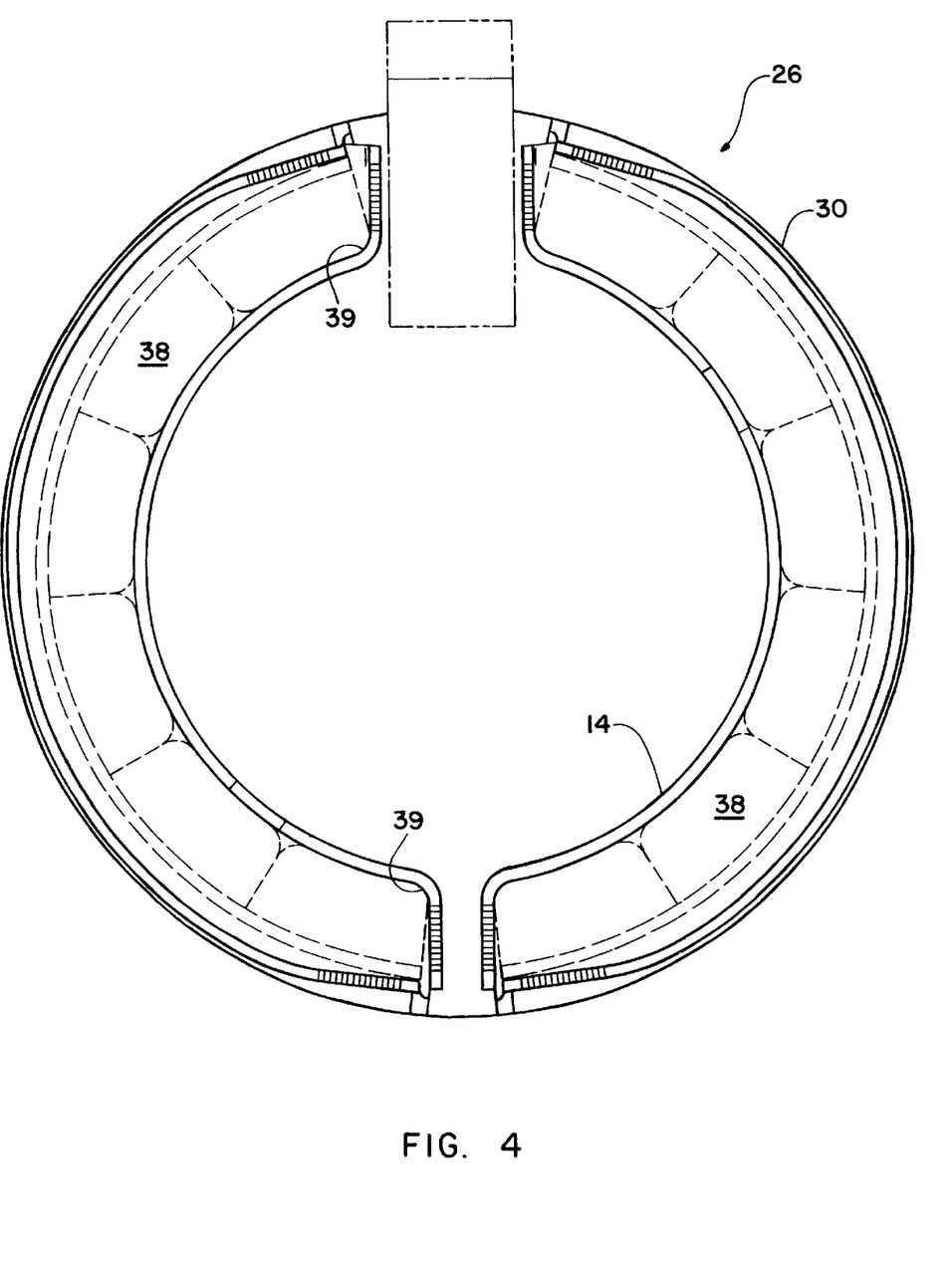
FIG. 4 is a simplified partial cross section taken generally along lines 4—4 and illustrates the thrust reversing system of the present invention shown in a deployed fan air blocking position.
Figure 5:
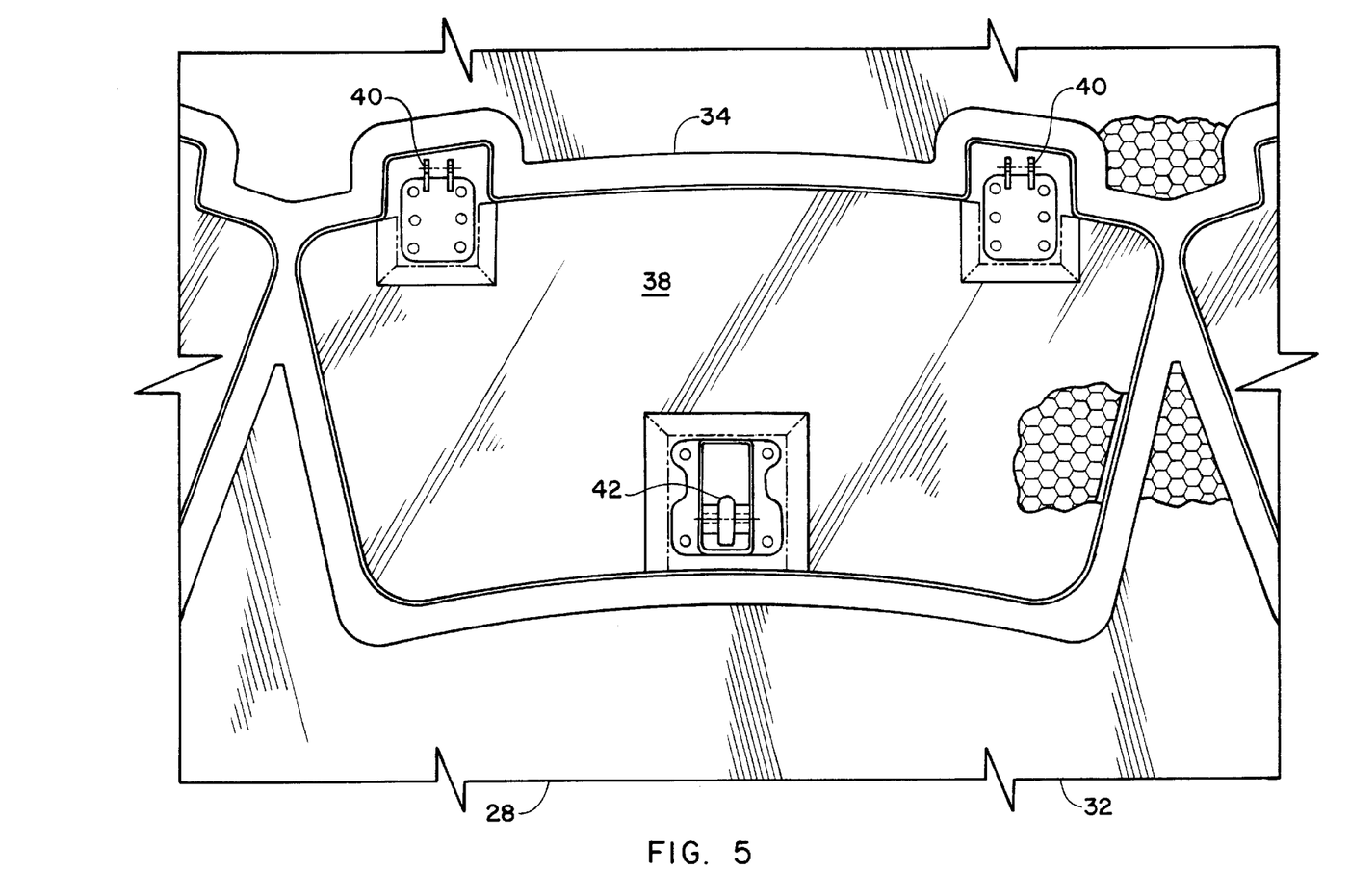
FIG. 5 is a simplified view looking normal to the inner surface of the inner wall of the translating sleeve structure to illustrate the positioning of each blocker door in such wall.
Figure 6:
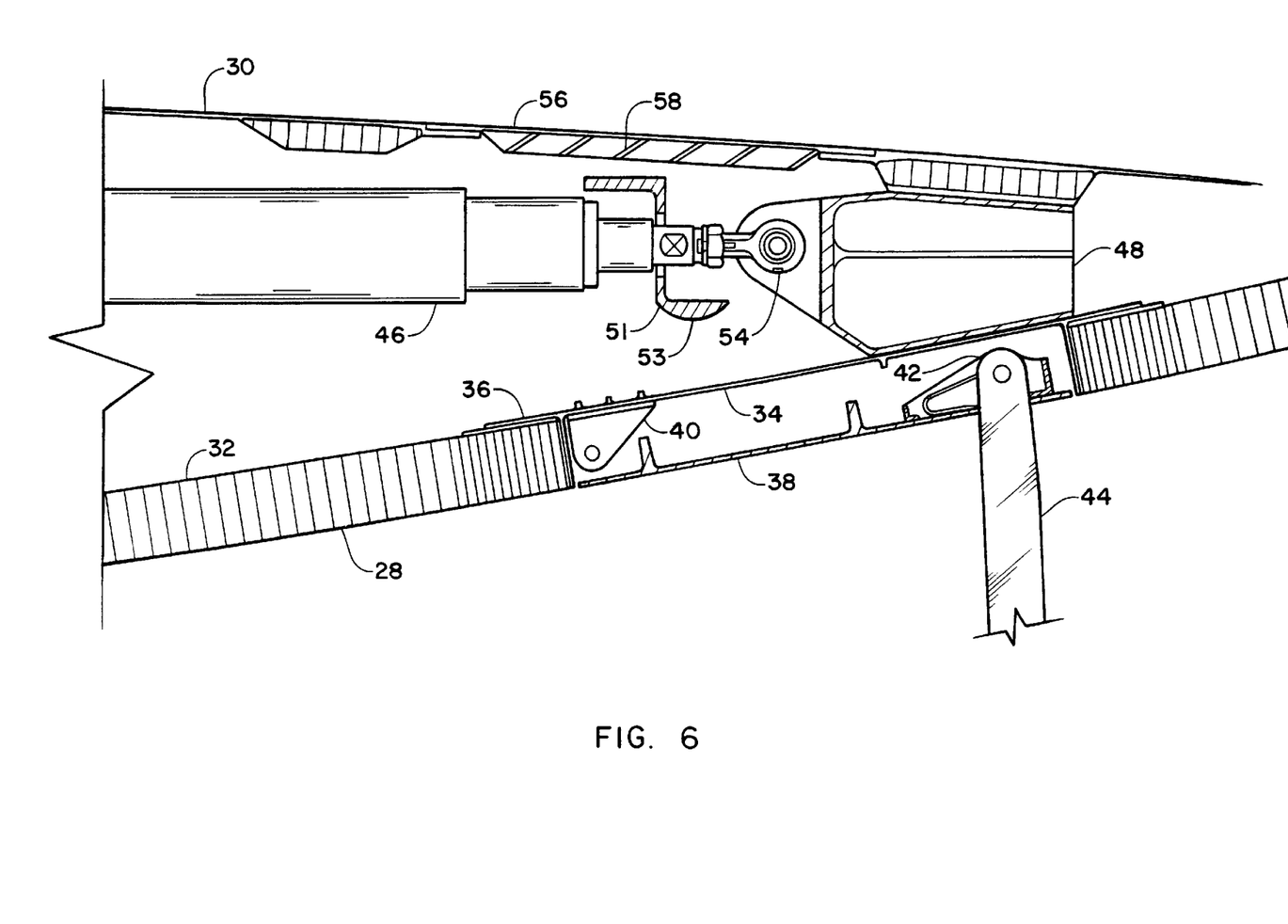
FIG. 6 is a partial cross section of another aspect of the portion of the thrust reversing system shown in FIG. 2.

A suitable blocker door 38, as seen in FIGS. 1, 4 and 5, is hingedly connected by suitable hinges 40 at its leading edge portions to an inner portion of each receptacle 34 and at its trailing edge portions each blocker door 38 is hingedly connected by suitable hinge connections 42 to a suitable link member 44 that is in turn hingedly connected by a suitable hinge 45 to the core cowl 14. For enhanced maintenance purposes the hinges 40 may be removably bolted to the receptacle 34 by suitable bolt means as seen in FIGS. 5 and 6.As seen in the FIGURES, each blocker door 38 fits within each receptacle 34 so that the outer surface of each blocker door 38 provides a continuation of the smooth inner wall 28. Each blocker door 38 may be acoustically treated by providing, for example, each door with a perforated inner skin with a honeycomb core lier such as is seen in the construction of the inner wall of the sleeve structure 26. However, since each blocker door 38 is smaller than a conventional blocker door if it is determined not to acoustically treat the door 38 the loss in acoustically treated area will be less. Thus, as the translating sleeve structure 26 is translated aft to the dotted position seen in FIG. 1, to provide an annular space 37 between the forward fixed structure 18 and the translated sleeve structure 26, shown in dotted outline in FIG. 1, each blocker door 38 is drawn inwardly by a fi connection 44 into abutting contact with the core cowl 14 thereby blocking the fan air and reversing it through the opening 37 provided by the translation of such sleeve structure 26. Each blocker door 38 may be acoustically treated and may be machined, precision forged, or constructed of advanced composites.

It will be appreciated from FIGS. 1 and 4, that since the blocker doors 38 are positioned aft of the leading edge of the inner wall 28 that they will abut, in the deployed position, the core cowl 14 at an enlarged circumferential portion and therefore blocker doors of a smaller size are required than blocker doors positioned at the leading edge of such inner wall 28 of the sleeve structure 26 since the duct provided for the fan air by the inner wall 28 and the core cowl 14 will have enlarged inner and outer diameters with respect to the fan duct at a forward position and thereby permit smaller blocker doors 38 to be utilized while maintaining the same fan duct exit area.

Referring specifically to FIG. 4, it will be noted that the inner corners of each door 38 are curved to reflect the curvature of the curved portions 28 of the core cowl 14. Thus, all blocker doors 38 may be made an identical size thereby reducing the cost of manufacture and reducing the part count. It would also be within the scope of the present invention to provide blocker doors 38 that would all have the same size but would not all be provided with curved corners at the inner end that would contact the core cowl 14. In such instance, only those doors 38 that would come into contact with the curved portions 39 of the core cowl 14 would be appropriately trimmed, as required to permit those doors to closely fit such curved portions 39 of the core cowl 14. Such an arrangement may be provided when it is desired to further decrease the blow-by per cent of the thrust reversing system 10.

Such receptacles 34 are positioned in such honeycomb core panel 32 aft of the longitudinal position of the bleed ports 16 appearing in the core cowl 14 thereby precluding any tendency of the elevated temperature and pressure gas flow issuing from such bleed ports 16 from impinging upon the blocker doors of the sleeve structure and injuring them in any respect.

The blocker doors 38 are preferably of a uniform size and are smaller than blocker doors that are positioned at the leading edge of a translating sleeve structure as is commonly seen in the art. By providing smaller, uniformly sized blocker doors 28, the present invention also improves the efficiency of the thrust reversing system 10 by reducing the blow-by of the fan air past the closed blocker doors 38 to a desired optimum percentage commensurate with providing a cooling flow of fan air over the aft portion of the core cowl 14, if such cooling is required. For example, in one application of the invention to a known propulsion system the recognized blow-by percentage of 10% was reduced to an optimum 5% blow-by percentage by the provision of the present invention. Referring to FIG. 4, it will be seen how the plurality of reduced size blocker doors 38 permit a close fitting of such doors in both a lateral and radial direction.

Figure 2:
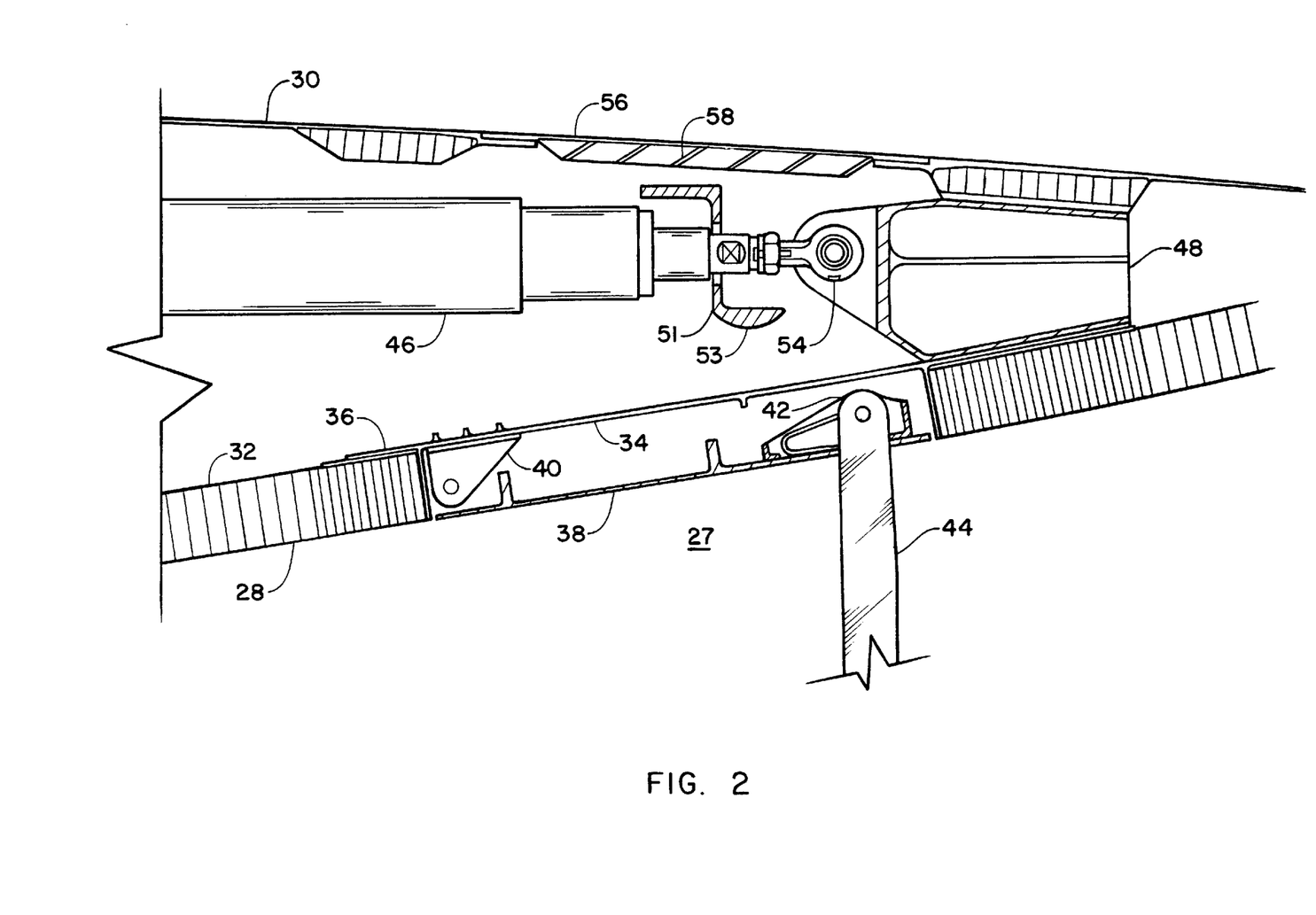
FIG. 2 is a partial cross section of a portion of the thrust reverser system illustrated in FIG. 1.

In FIGS. 1 and 2, it will be seen that a suitable translating means for translating the sleeve structure 26 fore and aft is provided. This translating means in the preferred embodiment of the invention takes the form of a plurality of circumferentially arranged spaced actuators 46, each of which is secured at a leading end to the forward fixed structure 18 in a suitable manner and at a trailing edge to a suitable fitting 48 positioned between the inner and outer walls 28 and 30 of the sleeve structure 26.

Figure 3:
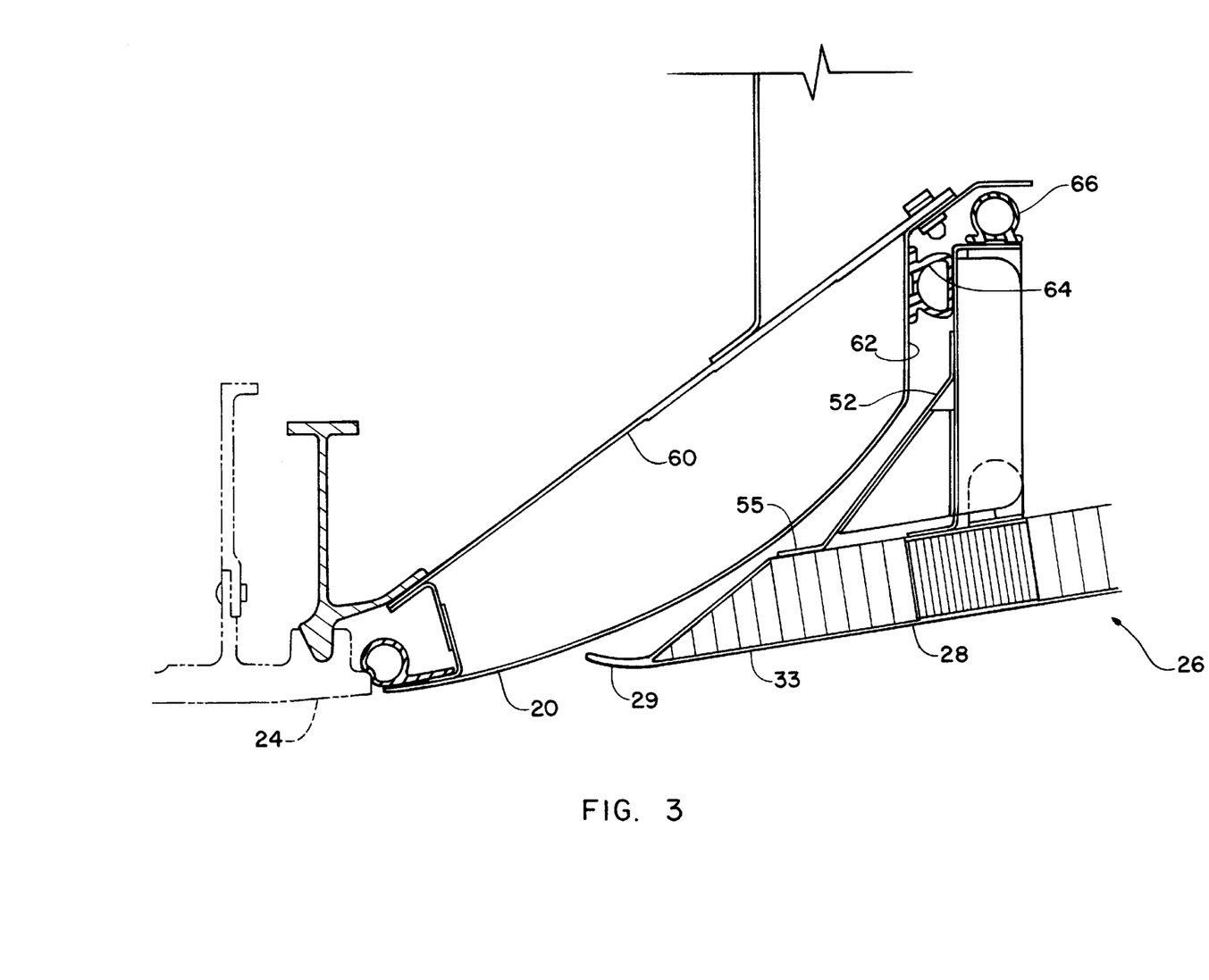
FIG. 3 is another partial cross section of another portion of the thrust reverser system illustrated in FIG. 1.

Also, a suitable cascade structure 50 having an aft cascade ring 51 is fixed to the forward fixed structure 18 for exposure to the reversed fan air and redirection of such fan air when the translating sleeve structure 26 is translated to deployed position. The aft cascade ring 51 which is secured to a fixed portion of the actuators 46, as seen in FIG. 2, is also provided with an arcuate shaped annular flange portion 53 for purposes to be described hereinafter. As seen in FIG. 3, a means is affixed to the inner leading side 55 of the inner wall 28 to assist the blocked fan air turning in an outwardly direction when the sleeve structure 26 is deployed. This means takes the form of an arcuate annular flow deflector 52 that is positioned on the inner side of the wall 28. Thus, when the translating sleeve is translated aft the flow deflector 52 directs the blocked fan air outwardly and rearwardly through the cascade structure 50 and also precludes the redirected fan air from entering the cavity provided by the spaced apart inner and outer walls 28 and 30 of the sleeve structure and causing an undesired internal pressure to be exerted upon the interior of the sleeve structure 26.

As seen in FIG. 2, each actuator 46 is removably attached to a fitting 48 in the sleeve structure 26 by a suitable connection 54. To permit access to such attachment of each actuator a suitable access door 56 is provided in the outer skin 30 of the sleeve structure 26 to permit desired access to each connection 54 of the actuator. Each such access door 56 is provided with suitable vents or louvers 58 which permit any reversed fan air which may enter the interior of the sleeve structure 26 to readily flow through such vented doors 56 to exit such interior without presenting any buildup of internal pressure therein.

Referring now to FIG. 3, it will be seen that the forward fixed structure 18 includes a suitable torque box 60 for reacting forces exerted upon the thrust reversing system 10 as is known in the art. The torque box 60 is provided on an inwardly spaced inner portion 62 with a suitable continuous annular pressure seal 64 that contacts a portion of the flow deflector flange 52 when the sleeve structure 26 is in its stowed position to preclude any thrust fan air from leaking between said forward fixed structure 20 and the translating sleeve structure 26 thereby improving the efficiency of the thrust reversing system 10. By placing the pressure seal 64 upon the fixed forward structure 18 rather than upon a portion of the translating sleeve structure 26 it is placed out of the primary flow of the reversed fan air and thereby its durability is enhanced To further enhance the sealing of structures of the translating sleeve structure 26, an additional seal 66 is secured to the upper portion of the flow deflector 52 for engagement with the flange portion 53 of the aft cascade ring 51 in the deployed position which reduces leakage when deployed and damps vibrations in the aft cascade ring 51 caused by blocked fan air flow through the cascades 50.

As was seen in FIGS. 1 and 2, the fitting 48 to secure the aft end of the thrust reverser actuator 46 to the trailing portion of the translating sleeve structure 26 may be attached to such structure 26 aft of the blocker doors 38. In practice, as seen in the FIGURES, the translating sleeve structure 26 is bifurcated with three actuators 46 being employed on each half of such bifurcated structure 26, for a large fan jet aircraft turbine engine, to reciprocally translate such structure 26. For a small jet engine, two thrust reverser actuators 46 could be used to translate each half of the structure 26. As is known in the art, each half of such translating sleeve structure 26 slides forward and aft on appropriate tracks (not shown). To ensure that there is no "binding" of the sleeve structure 26 on such tracks as it is translated, the actuators 47 are carefully spaced apart circumferentially to ensure proper balancing of the actuating forces at all points in such translation.

In some applications, it may be desirable to shorten the stroke of the actuator 46 and to move the fitting 48 for securing each such actuator 46 to the sleeve structure 26 forwardly. In such instance, as seen in FIG. 6, the fitting 48 may be secured directly to a receptacle 34. If found desirable, an appropriate doubler (not shown) ray be secured to the inner surface of the receptacle 34 for reinforcement purposes.

Figure 7:
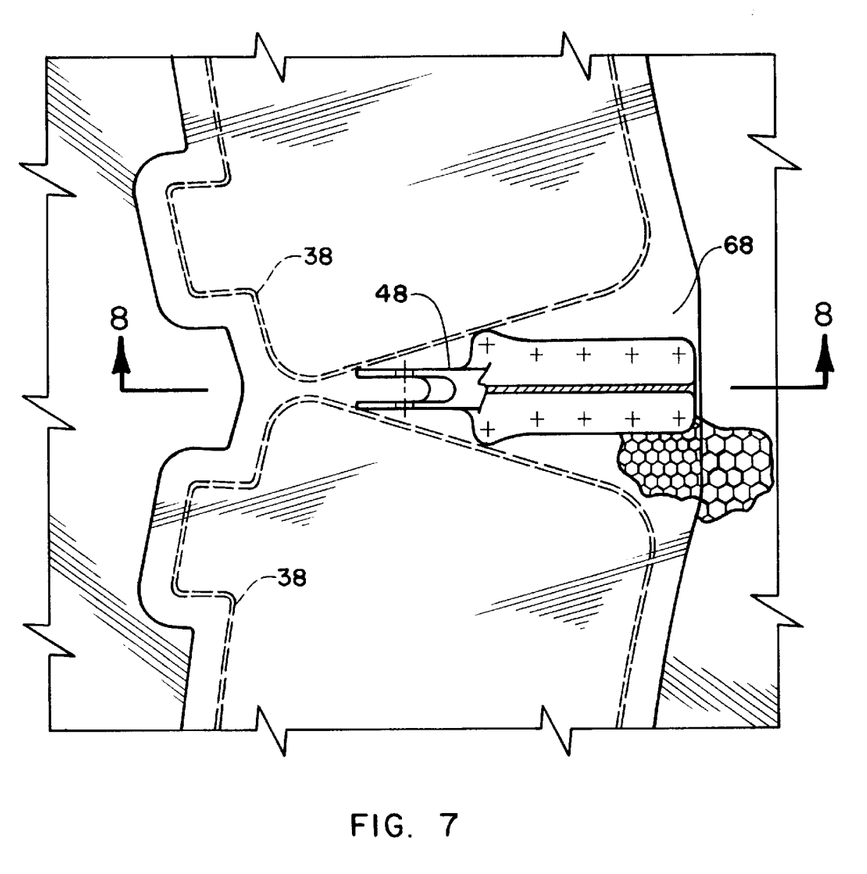
FIG. 7 is a partial plan view of another aspect of the portion of the thrust reverser system shown in FIG. 2.
Figure 8:
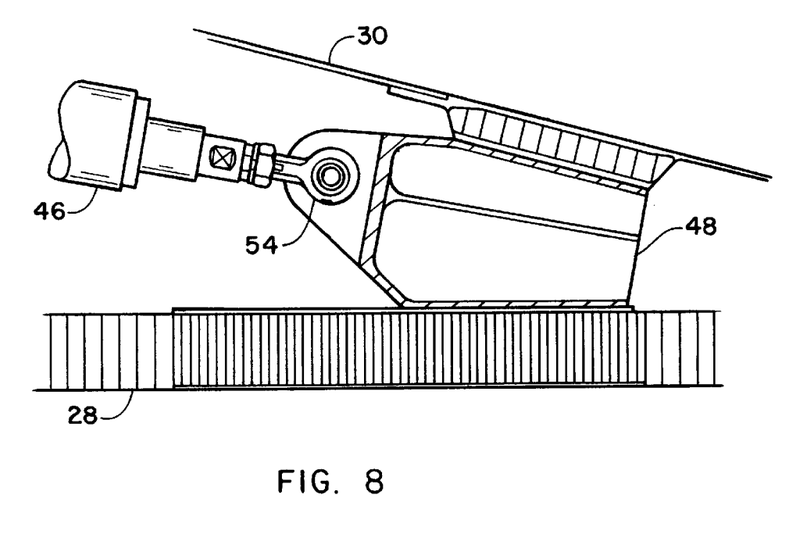
FIG. 8 is a cross section taken along lines 8—8 in FIG. 7.

Referring to FIGS. 7 and 8, it will be seen that a fitting 48 may also be positioned on an island 68 in the inner panel 28 that appears between every two adjacent blocker doors 38. Thus, it is seen that the fittings 48 may be spaced circumferentially around the inner surface of the inner panel 28 and longitudinally as well, as may be required for correct balance without regard to the spacing or the longitudinally positioning of the blocker doors 38 within the inner panel 28.

From the above description, it will be seen that the desired objects of the invention to overcome the shortcomings of the prior art and to improve upon it have been achieved. It will be further appreciated that while a presently preferred embodiment of the invention has been described for purposes of this particular disclosure, numerous changes may be made which will rapidly suggest themselves to those skilled in the art and which are encompassed withing the spirit of the invention disclosed and defined in the appended claims.

What is claimed is:

1. In a cascade type thrust reversing system for controlling fan air from a fan gas turbine jet engine for an aircraft, said engine having a core cowl that is provided with bleed port means positioned aft of a fixed fan cowl structure, the combination comprising:

a forward fixed structure having inner and outer walls positioned immediately aft of the fixed fan cowl structure;

a translatable sleeve structure, having inner and outer walls, that is positioned in an abutting position in a stowed position to said forward fixed structure, the inner wall of said sleeve structure being provided with a plurality of circumferentially arranged deployable blocker doors that are horizontally positioned in said inner wall aft of said bleed port means, and translating means for translating said translating sleeve structure rearwardly to deploy said blocker doors into abutting contact with the core cowl and thereby block the fan air and redirect it outwardly through an annular space provided between said forward fixed structure and the translated sleeve structure.

2. The arrangement of claim 1 wherein the inner wall of the translatable sleeve structure comprises a single layer honeycomb core panel structure having circumferentially arranged receptacles for receiving said blocker doors.

3. The arrangement of claim 2 wherein each receptacle comprises a single metal receptacle having hinge means for hingedly receiving each blocker door, and further includes hinge connection means hingedly connecting each blocker door to said core cowl whereby when the translating means translates the translatable sleeve structure aft the blocker doors are hingedly rotated inwardly to a fan air blocking position.

4. The arrangement of claim 3 wherein each blocker door is hingedly connected to said core cowl a sufficient distance aft of said bleed port means to preclude damage to the blocker doors or to the blocker doors hinged connections in the event a gas turbine jet engine positioned within said core cowl should expel gas from the core engine through said bleed port means at an elevated temperature and pressure.

5. The arrangement of claim 4 where all of said blocker doors are same size and have the same configuration.

6. The arrangement of claim 5 wherein each blocker door is acoustically treated.

7. The arrangement of claim 4 wherein the translatable sleeve structure is provided at its leading side with flow deflector means to assist in reversing the blocked fan air flow and directing it outwardly when said sleeve structure is translated aft to a fan air blocking position.

8. The arrangement of claim 7 wherein the flow deflector means comprises an arcuate annular member arrangement secured to the lower leading edge portion of the of said translating sleeve structure.

9. The arrangement of claim 7 which further includes pressure relief means to preclude fan air pressure build up within said translating sleeve structure as said translating sleeve structure is deployed.

10. The arrangement of claim 9 wherein said pressure relief means to preclude fan air pressure build up within said translating sleeve comprises vent means provided in said outer wall of said sleeve structure aft of its leading edge.

11. The arrangement of claim 10 wherein said vent means comprises a plurality of vented doors provided in said outer wall to permit access to a portion of said translating means that is operatively connected to said translating sleeve structure.

12. The arrangement of claim 4 which further includes seal means positioned on said forward fixed structure for cooperation with the translating sleeve structure to prelude fan air from leaking between said fixed structure and said translating sleeve structure when said translating sleeve structure is stowed.

13. The arrangement of claim 12 wherein said seal means comprises an annular pressure seal portion which cooperates with said flow deflector means to preclude fan air leakage therebetween in said stowed position.

14. A translating sleeve structure for a cascade type thrust reverser for controlling fan air from an aircraft fan gas turbine jet engine, said engine having a bypass fan air duct and a core cowl provided with circumferentially arranged bleed port means for relieving excessive temperature and pressure fluid associated with the engine, which sleeve structure comprises:

a translating sleeve structure having outer and inner skins that are spaced apart a predetermined distance at their leading edges and which are joined together at a trailing edge of such sleeve structure, said inner skin having circumferentially arranged spaced receptacles provided entirely within said skin for hingedly receiving a blocker door within each such receptacle, said blocker door receptacles being spaced rearwardly from the leading edge of said sleeve structure and aft of said bleed port means provided in the core cowl of the gas turbine engine, and a blocker door hingedly positioned within each such receptacle and hingedly connected through a link connection to the core cowl of a gas turbine engine whereby translation of said sleeve structure rotates said blocker doors to a fan air blocking position without possible exposure to excessive temperature and pressure of fluid which may be expelled through said bleed port means.

15. The arrangement of claim 14 wherein said blocker doors all have the same size and configuration and are rotated into abutting contact with said core cowl at a increased aft diameter portion of said core cowl thereby resulting in improved thrust reverser performance by reducing the blow-by of the fan air past such closed blocker doors to an optimum desired air flow.

16. The arrangement of claim 15 wherein each blocker door receptacle is formed as a unitary metal configuration.

17. The arrangement of claim 15 wherein the inner skin of such sleeve structure comprises a single layer honeycomb panel structure.

18. The arrangement of claim 14 which further includes vent means to preclude reversed fan air increasing the interior air pressure of the sleeve structure to an undesired level when said sleeve structure is deployed to a thrust reversing position.

19. The arrangement of claim 18 wherein the vent means comprises vented doors positioned in the outer skin of such sleeve structure for providing access to actuators connected to said sleeve structure for selective translation thereof thereby permitting reversed fan air that flows into the interior of said sleeve structure to flow outwardly though such vented doors.

20. The arrangement of claim 15 which further includes flow deflector means secured to the leading edge of the inner skin of said sleeve structure to direct the flow of reversed fan air outwardly and away from the interior of such sleeve structure.

21. The arrangement of claim 20 wherein said flow deflector means comprises an arcuate annular structure secured inwardly of the leading edge of the inner skin of such sleeve structure for deflecting the reversed fan air flow in a predetermined direction.

\* \* \* \* \*